J. IRGENS.
Fish Hook.

No. 231,912. Patented Sept. 7, 1880.

Witnesses:
Willy J. C. Schultz
John C. Tunbridge

Inventor:
Jorgen Irgens
by his attorney
a.v. Briesen

UNITED STATES PATENT OFFICE.

JORGEN IRGENS, OF BERGEN, NORWAY.

FISH-HOOK.

SPECIFICATION forming part of Letters Patent No. 231,912, dated September 7, 1880.

Application filed January 23, 1880

*To all whom it may concern:*

Be it known that I, JORGEN IRGENS, of Bergen, in the Kingdom of Norway, have invented a new and Improved Fish-Hook Attachment, of which the following is a specification.

My invention relates to improvements in that class of fish-hooks which are provided with a bright polished or glistening attachment or bait to allure the fish.

My invention has for its object to provide an attachment that will remain bright for an indefinite length of time, and that will not be affected by the action of the air and water, and is readily detachable from and attachable to the hook.

It consists in making a hollow open-ended attachment of silvered or gilt glass or vitrified pottery, and in connecting the attachment with the hook, so that the water cannot get within it.

Figure 1:
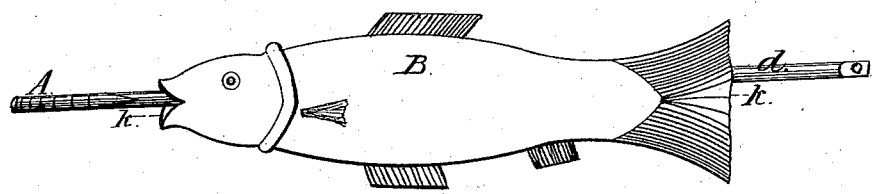
Figure 2:
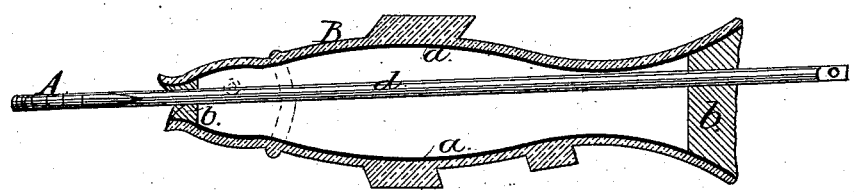
Figure 3:
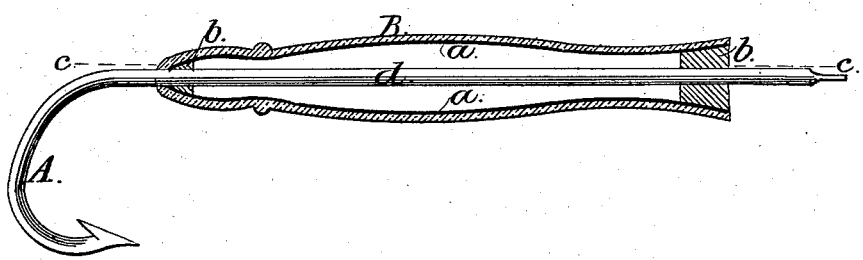

In the accompanying drawings, Figure 1 is a side elevation of my improved attachment connected with a fish-hook. Fig. 2 is a vertical longitudinal section of the same, taken on line $c\ c$ of Fig. 3; and Fig. 3 is a horizontal longitudinal section of the same, taken on line $k\ k$ of Fig. 1.

Referring to the drawings, A represents a fish-hook of ordinary form, and B represents the attachment, which, as here shown, is of the form of a fish. The attachment B is made of glass, hollow inside, and with open ends. The glass employed in the manufacture of the attachment may be white or tinted in suitable colors to imitate the various colored fish. The inner surface of the attachment is coated with silver or gold leaf, (represented by the heavy lines and indicated by the letter $a$.) Instead of silvered or gilt glass, vitrified pottery may be used. The attachment B is connected with the shank of the hook A by passing the hook through it in the manner shown, and then fastening it by means of cement, $b$, or putty inserted in the open ends, forming plugs, which stop up the open ends of the attachment, and thereby exclude the water, dirt, &c., from the interior, and at the same time securely fasten the hook in the attachment.

In place of the pisciform attachment here described and shown, one of other form, but having the characteristics of the invention, may be used. The tubular attachment is more economical than the rigid attachments heretofore employed, and it is much more durable, as it is impervious to the action of air and water, while the silver coating or coloring, being protected from the action of air and water and from the abrasive action of sand and other solid matter by the outer thickness of glass, keeps the attachment bright.

The attachment can be readily taken off the hook by unfastening the cement plugs $b$, leaving the hook in condition for use with an ordinary bait, and can be as readily reapplied.

I am aware that imitations of fish, minnows, &c , have been used on fishing-hooks, snoods, &c., to allure fish; but these have always been made heretofore of metal, which soon tarnished and required frequent polishing to keep the bait in order. Further, heretofore these imitation fish or minnows were swiveled on the snoods or hooks, so as to revolve freely, and the water could flow through them.

My invention is to furnish an artificial minnow for the purpose of a bait which is impervious to the action of the water or air, and which is attached to the shank of the hook so as to be easily removed therefrom or attached to the shank, but having its interior surface protected against the entrance of water. I therefore expressly disclaim metal imitations of minnows, &c., and also attaching the bait so that it will revolve on the hook or snood and allow the water to enter within it.

I claim—

1. As an improved article of manufacture, the attachment or bait B for fishing-hooks, said attachment being of glass or other transparent vitrified material externally, and with the inner lining, $a$, of metal or coloring substance, substantially as described.

2. The glass or transparent vitrified tubular attachment or bait B, made in one piece and rigidly attached at the ends only to the shank of the hook, in combination with the said shank $d$, which is passed entirely through the attachment B, and with the plugs $b$ in the ends of the same, substantially as described.

The foregoing description of my invention signed by me this 27th day of November, 1879.

JORGEN IRGENS.

Witnesses:
ULRICH RUEL,
ANDRE JACOBSEN.